United States Patent
Simonsson

(10) Patent No.: US 6,950,669 B2
(45) Date of Patent: Sep. 27, 2005

(54) POWER CONTROL ALGORITHM FOR PACKET DATA BASED ON QUEUE/CHANNEL UTILIZATION

(75) Inventor: Arne Simonsson, Gammelstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 761 days.

(21) Appl. No.: 09/854,798

(22) Filed: May 14, 2001

(65) Prior Publication Data

US 2002/0004407 A1 Jan. 10, 2002

Related U.S. Application Data

(60) Provisional application No. 60/215,954, filed on Jul. 5, 2000.

(51) Int. Cl.[7] .................................................. H04B 7/00
(52) U.S. Cl. ...................... 455/522; 455/453; 455/67.1; 455/522; 709/219; 370/329
(58) Field of Search ................................ 455/522, 67.1, 455/450, 453, 69, 501, 561; 709/219, 249; 370/329, 331

(56) References Cited

U.S. PATENT DOCUMENTS 5,574,848 A    11/1996  Thomson
6,317,600 B1 * 11/2001  Salonaho et al. ............ 455/453
6,374,117 B1 *  4/2002  Denkert et al. ............. 455/522
6,469,993 B1 * 10/2002  Seo et al. ................... 370/329
6,671,512 B2 * 12/2003  Laakso ....................... 455/453

FOREIGN PATENT DOCUMENTS

| EP | 0847147 A2 | 6/1998 |
| EP | 0847147 A3 | 8/2000 |
| WO | WO01/47114 A1 | 6/2001 |

OTHER PUBLICATIONS

"A Power Control and Scheduling Concept for EGPRS," Arne Simonsson et al., Ericsson Radio System AB, Stockholm, Sweden.

* cited by examiner

Primary Examiner—Nick Corsaro
Assistant Examiner—Alan T. Gantt

(57) ABSTRACT

Method and system are disclosed for improving the channel quality in a packet data radio network. In each cell of the radio network the packet data is measured based on channel utilization and/or packet queue measurements. A power control algorithm uses the packet data load to determine a common or equal broadcast or transmitted power level for the channels in the cell. The common broadcast or transmitted power may subsequently be adjusted on an individual channel basis for channels that fall outside a predefined quality window.

39 Claims, 6 Drawing Sheets

POWER CONTROL ALGORITHM FOR PACKET DATA BASED ON QUEUE/CHANNEL UTILIZATION

CLAIM OF PRIORITY

This application claims priority from, and incorporates herein by reference, provisional application No. 60/215,954, entitled "Power Control Algorithm for Packet Data Based on Queue/Channel Utilization," filed with the U.S. Patent and Trademark Office on Jul. 5, 2000.

BACKGROUND OF THE INVENTION

1. Technical Field of the Invention

The present invention is related to improving the channel quality in a packet mobile radio network and, in particular, to a method and system therefor using a power control algorithm.

2. History of the Related Art

Power control has traditionally been used in mobile radio networks as a way to improve the channel quality between a mobile terminal and the network. For example, the transmitted power can be increased to improve the carrier-to-interference ratio (C/I) of a channel, thereby improving the data rate or throughput of the channel. The transmitted power can also be decreased to reduce the interference that the channel has on other channels.

An example of such power control can be found in circuit-switched mobile radio networks such as the Global System for Mobile communications (GSM), where the transmitted power is adjusted on an individual channel basis. See, e.g., U.S. Pat. No. 5,574,982 and "Power Control in a Cellular System" by Magnus Almgren, Hakan Andersson, and Kenneth Wallstedt. The adjustments may be made according to any number of known radio link quality measurements such as the received signal strength indicator (RSSI), the C/I, the bit error rate (BER), the bit error probability (BEP), the energy per bit over noise (Eb/No), and the frame erasure rate (FER).

Power control for packet-switched mobile radio networks may be found in a GSM standard, namely GSM 05.08 (version 8.5.0) which includes a proposition for power control in the Enhanced General Packet Radio System (EGPRS).

Similarly, control of the transmitted power is a central function of systems that use code division multiple access (CDMA), as all channels have to share the same set of frequencies. See, e.g., Universal Mobile Telecommunication System (UTMS) standard 3GPP TS 25.214 (version 3.5.0) that provides the power control specifications for UTMS, which is a CDMA system.

In general, however, it is difficult in presently available mobile radio networks to measure radio link quality with a sufficiently high degree of accuracy. Such difficulty arises, in part, because the quality measurements have to be made remotely by the mobile terminals, then transmitted or otherwise reported to the mobile radio networks for processing, thus opening the possibility for reporting errors to occur. The measurement difficulties increase for packet data transmission with short packages and long packet inter-arrival times. This is due to the fact that during non-transfer times, either the measurement accuracy will be lower or the measurement signaling overhead will be larger.

Moreover, radio link quality as reflected by a quality measurement such as the C/I may not be a very good measure of channel quality for mobile radio networks that use packet data. For example, the C/I may not be able to accurately reflect packet delays caused by queuing that decrease the channel data rate and thereby degrade the channel quality. Computer simulations of such packet data mobile radio networks have shown, for example, that users with the worst channel quality do not have significantly lower radio link quality.

Therefore, it is desirable to be able to improve the channel quality in packet data mobile radio networks, and to be able to do so using measurements that more accurately reflect the actual channel quality in such packet data networks.

SUMMARY OF THE INVENTION

Embodiments of the present invention provide a method and system for improving the channel quality in a packet data radio network. In a cell of the radio network, the packet data is measured based on channel utilization and/or packet queue measurements. A power control algorithm uses the packet data load to determine a common or equal broadcast or transmitted power level for a plurality of channels in the cell. The common broadcast or transmitted power may subsequently be adjusted on an individual channel basis for channels that fall outside a predefined quality window.

In general, in one aspect, the invention is directed to a method of controlling transmitted power in a cell of a packet data mobile radio network. The method comprises the steps of measuring a packet data load in the cell, determining a common transmitted power based on the packet data load, and applying the common transmitted power to a plurality of channels in the cell.

In general, in another aspect, the invention is directed to a system for controlling transmitted power in a cell of a packet data mobile radio network. The system comprises a base transceiver station, a channel scheduler in the base transceiver station configured to measure a packet data load in the cell, and a power control unit connected to the channel scheduler and having a power control algorithm therein. The power control algorithm is configured to determine a common transmitted power based on the packet data load, and the power control unit is configured to apply the common transmitted power to a plurality of channels in the cell.

In general, in yet another aspect, the invention is directed to a method of controlling transmitted power in a cell of a packet data mobile radio network. The method comprises measuring a packet data load in the cell based on a predetermined one of channel utilization and packet queue measurements, determining a common transmitted power based on the packet data load, and applying the common transmitted power to a plurality of channels in the cell. A radio link quality is measured for the plurality of channels, and the common transmitted power is adjusted for any channel having a radio link quality measure outside a quality window that is defined based on a predetermined one of channel data rate and carrier-to-interference ratio.

Advantages of the invention include improved channel quality and capacity in packet data mobile radio networks, a local power control algorithm in the base transceiver station, and quality measurements that are directly available at the base transceiver station. Other advantages of the invention will become apparent from the following description and the claims.

BRIEF DESCRIPTION OF THE DRAWINGS

A more complete understanding of the method and system of the present invention may be had by reference to the detailed description in conjunction with the following drawings, wherein.

DETAILED DESCRIPTION OF THE EXEMPLARY EMBODIMENTS

Figure 1:
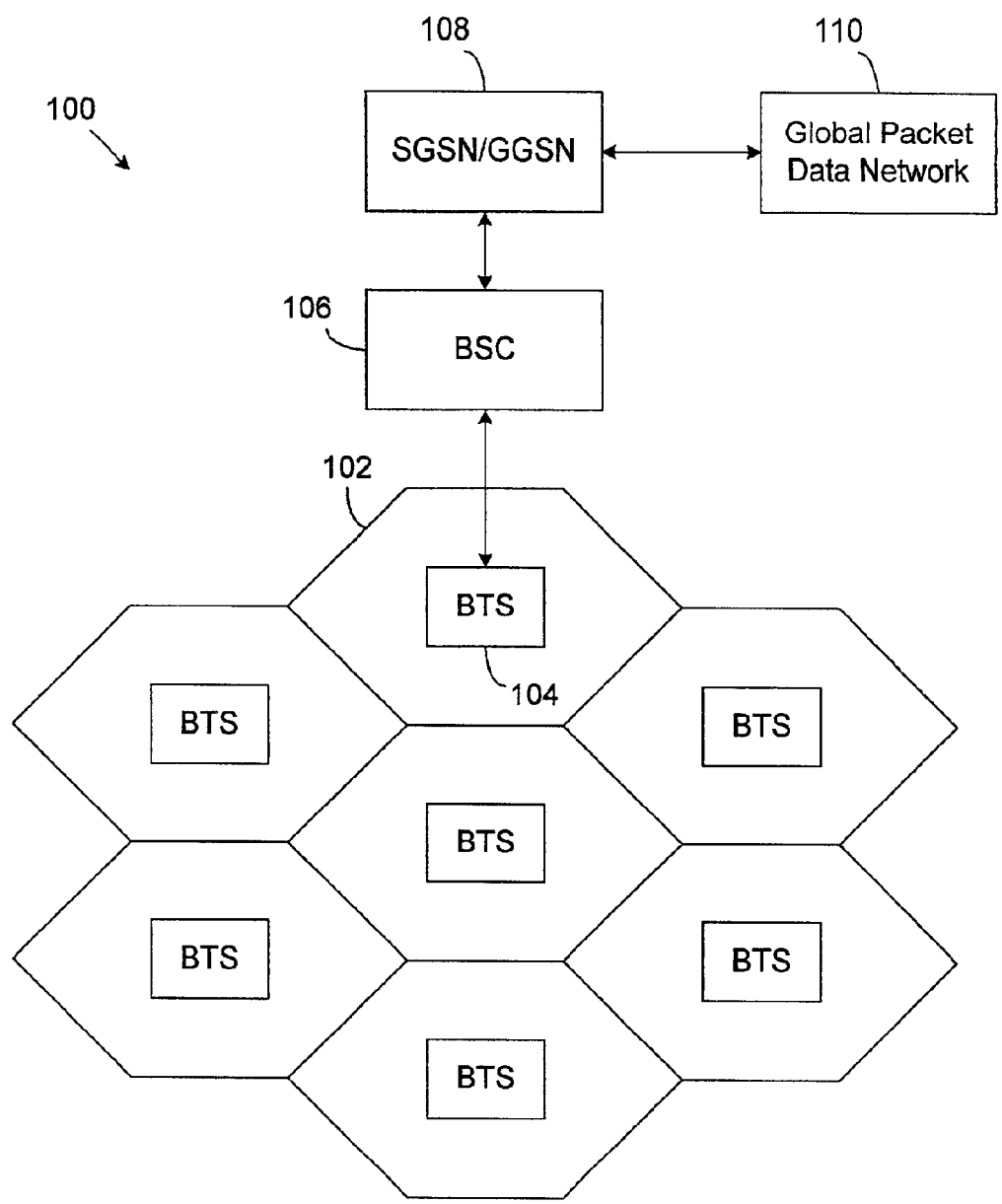
FIG. 1 illustrates a pertinent part of an exemplary mobile radio network.

Following is a detailed description of the exemplary embodiments of the present invention with reference to the drawings, wherein reference numerals for the same elements are carried forward.

As mentioned earlier, embodiments of the present invention provide a method and system for improving the channel quality in a packet data mobile radio network. Such networks may include the General Packet Radio System (GPRS), the Enhanced General Packet Radio System (EGPRS), or other packet-switched networks.

In general, packet-switched networks differ from traditional circuit-switched mobile radio networks in that the circuit-switched networks typically have a fixed number of channels for each allocated radio frequency. The term "channel" as used herein refers to the radio frequency link between a single mobile terminal and the mobile radio network. For example, in GSM, each channel typically occupies one time slot of an allocated radio frequency. Thus, the number of mobile terminals using a given radio frequency at any time in a circuit-switched network is limited to the number of time slots available per radio frequency (typically eight time slots).

Packet-switched networks, on the other hand, have a flexible number of channels per allocated radio frequency because the recombinant nature of packet data allows a single time slot to carry two or more different channels. For example, in EGPRS, each channel can occupy from merely a fraction of a time slot up to several time slots depending on the total number of time slots available in each radio frequency. Thus, the number of mobile terminals using a given radio frequency at any time in a packet-switched network may exceed the number of time slots available. Accordingly, packet-switched networks have an additional parameter available therein for tuning channel quality: namely, the number of channels, or channel quantity.

FIG. 1 illustrates a pertinent part of an exemplary packet data mobile radio network 100. The packet data mobile radio network 100 includes a plurality of cells 102, each cell 102 having a plurality of radio frequencies allocated thereto for use therein. The radio frequencies are typically allocated to the cells 102 by the packet data mobile radio network 100 in accordance with a predefined frequency allocation plan. Each cell 102 further has at least one base transceiver station 104 for transmitting/receiving mobile calls to/from a plurality of mobile terminals (not expressly shown) over the allocated radio frequencies. A base station controller 106 controls the operation (e.g., handovers, channel assignments) of the least one base transceiver station 104.

The base station controller 106 is in turn controlled by a packet data core network 108 that includes, for example, a serving GPRS support node (SGSN) and a gateway GPRS support node (GGSN). The packet data core network 108 routes mobile calls between the packet data mobile radio network 100 and other telephony and/or data communication networks. Such other telephony and/or data communication networks 110 may include, for example, a global packet data network 110 such as the Internet.

Figure 2:
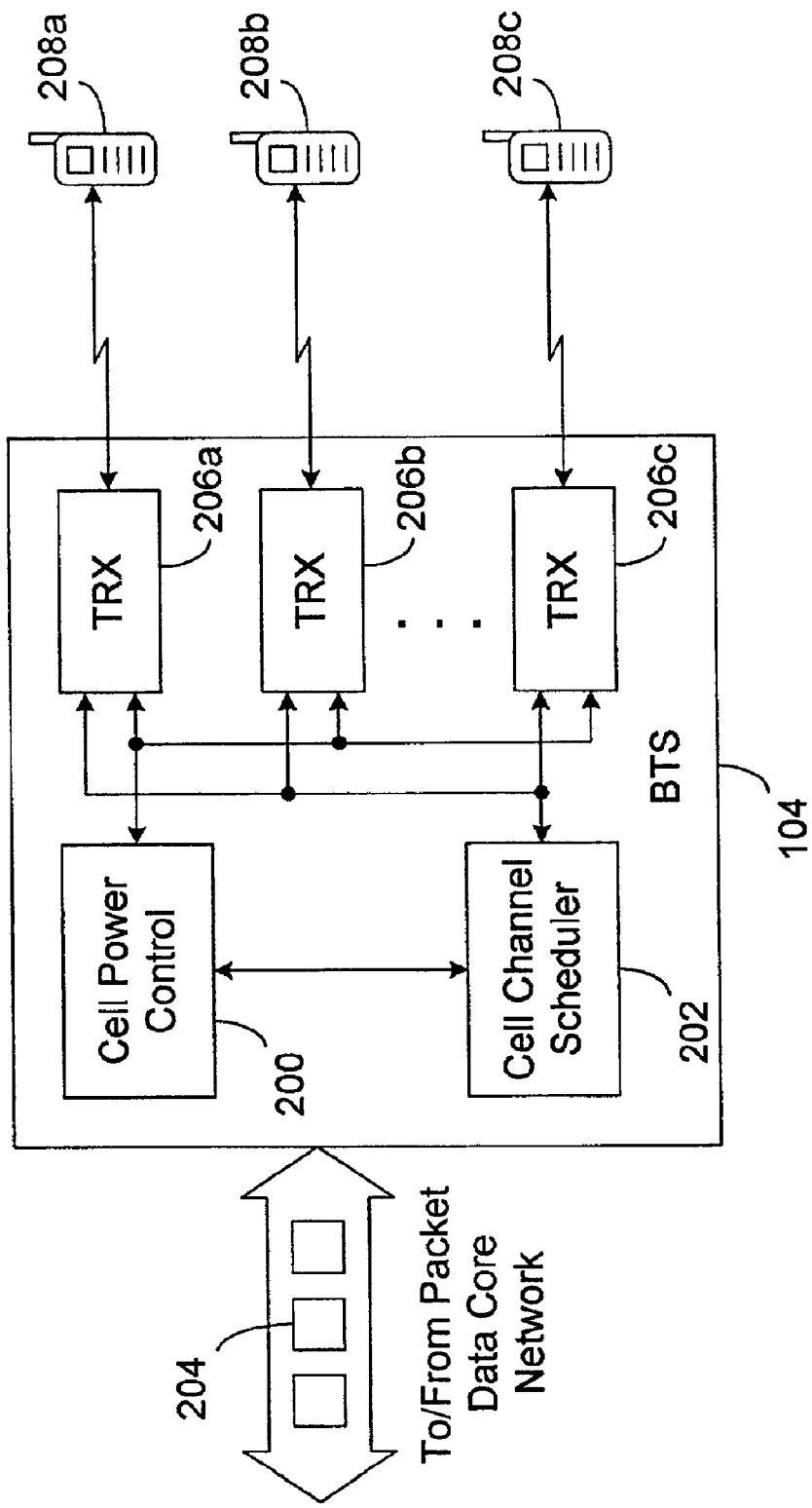
FIG. 2 illustrates a base transceiver station according to some embodiments of the invention.

FIG. 2 illustrates the base transceiver station 104 according to some embodiments of the present invention. The base transceiver station 104 has a number of functional components including a cell power control unit 200 and a cell channel scheduler 202. In operation, a plurality of packets 204 from the packet data core network 108 are received at the base transceiver station 104 and temporarily stored therein. The received packets 204 are thereafter processed by the functional components of the base transceiver station 104 including the cell power control unit 200 and the cell channel scheduler 202. The processed packets 204 are subsequently transmitted via one or more transceiver units 206a–206c to one or more mobile terminals 208a–208c. Likewise, packets received from the mobile terminals 208a–208c may be received by the transceiver units 206a–206c and thereafter processed by the base transceiver station 104 for forwarding to the packet data core network 108.

Although a suitable broadcast or transmitted power level may be used for each channel individually, in some embodiments, the packets 204 are broadcast or transmitted to the mobile terminals 208a–208c using an equal or common power level for all or substantially all the channels in the cell. Transmitting at a common power level for all or substantially all the channels can have the effect of improving the channel quality throughout the entire cell. This effect has been described, for example, in an article entitled "A Power Control and Scheduling Concept for EGPRS" by Arne Simonsson, Magnus Almgren, and Magnus Thurfjell. In the article, it is explained that a near to optimal cell data rate and/or throughput may be achieved by using an equal or common power level in combination with adjusting the channel quantity. The article further explains that the channel quantity can be adjusted with channel allocation (i.e., changing the number of time slots available for a given mobile terminal), or channel scheduling (i.e., changing the portion of one time slot available for a given mobile terminal), or a combination of both.

Although all or substantially all of the channels are broadcast or transmitted using the equal or common power level in the preceding embodiments, in other embodiments, fewer than all of the channels may be broadcast or transmitted using the equal of common power level, depending on the requirements of the particular packet data radio network. For example, the equal or common power level may be applied to groups of channels or groups of users. The groups of users or groups of channels may be defined, for example, based on their Quality of Service (QOS) requirements or other similar criteria. Transmitting at an equal or common power level for such service groups can reduce the emitted interference more so than transmitting with an individual power level for each mobile terminal in the service group. This effect has also been described in the article mentioned above, where it is explained that lower emitted co-channel interference may be achieved while maintaining channel quality by using an equal or common power level in combination with adjusting the scheduled channel quantity to each mobile terminal.

Figure 3:
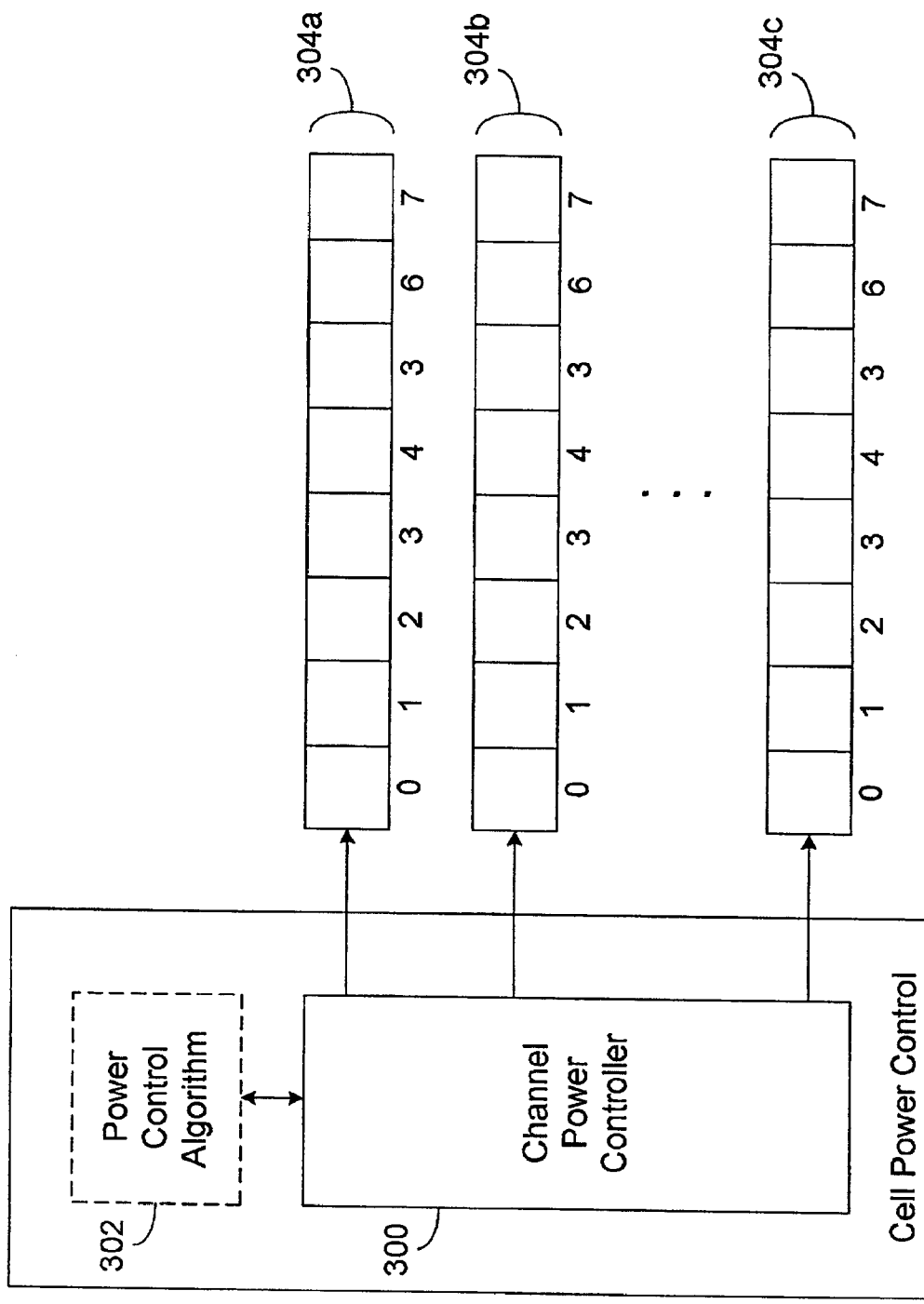
FIG. 3 illustrates a cell power control unit according to some embodiments of the invention.

FIG. 3 illustrates the cell power control unit 200 according to some embodiments of the present invention. The cell power control unit 200 has a number of functional components therein including a channel power controller 300. The channel power controller 300 functions primarily to control the broadcast or transmitted power of each channel in the cell. Specifically, the channel power controller 300 controls the broadcast or transmitted power for each one of a plurality of time slots 0–7 in the radio frequencies 304a–304c allocated to the cell. The techniques for controlling the broadcast or transmitted power of the time slots (hence, any channels therein) are known to those of ordinary skill in the art and will not be described here. It should be noted, however, that care should be taken when attempting to control the power so as to avoid "party" effects that may occur, as described in U.S. Pat. No. 5,574,982 mentioned above and incorporated herein by reference.

In some embodiments, the cell power control unit 200 performs its function using a power control algorithm 302 (dashed lines) that is configured to establish an equal or common power level for the channels in the cell. The power control algorithm 302 determines this equal or common power level based on, for example, the packet data load measured for the cell or a portion of the cell, or other similar cell load measurements. For example, in some embodiments, if the packet data load for the cell or a portion thereof is at a high or maximum specified level, then the common or equal power level derived by the power control algorithm 302 may be a high or maximum specified power level. Alternatively, if the packet data load for the cell or a portion thereof is at a low or minimum specified level, then the common or equal power level derived by the power control algorithm 302 may be a low or minimum specified power level. In general, the power control algorithm 302 determines an equal or common power level that corresponds to the packet data load in such a way that a near to optimal data rate and/or throughput is achieved for the cell or a portion thereof.

After such equal or common power level has been determined, the channel power controller 300 adjusts the broadcast or transmitted power level for some, all, or substantially all the channels in the cell in accordance with the recently determined common power level. The channel power controller 300 makes these adjustments by adjusting the power level for each respective time slot 0–7 in the radio frequencies 304a–304c allocated to the cell.

The packet data load measured in the cell, in some embodiments, may be based on either the channel utilization in the cell, one or more packet queue measurements, or a combination of both. The term "channel utilization" as used herein refers to the degree or extent that the channels in a cell are using an allocated radio frequency. For example, full channel utilization means 100 percent of all the time slots of an assigned radio frequency are presently in use.

In some embodiments, the instant value of the packet data load may be used by the power control algorithm 302. In other embodiments, a statistically derived value of the packet data load (e.g., an average over time) may be used instead. In still other embodiments, the value of the packet data load used may be a filtered or weighted value based on one or more criteria in accordance with a predetermined weighing scheme. In any case, the packet data load may thereafter be factored into the power control algorithm 302 and used to derive the equal or common power level for the channels in the cell.

Figure 4:
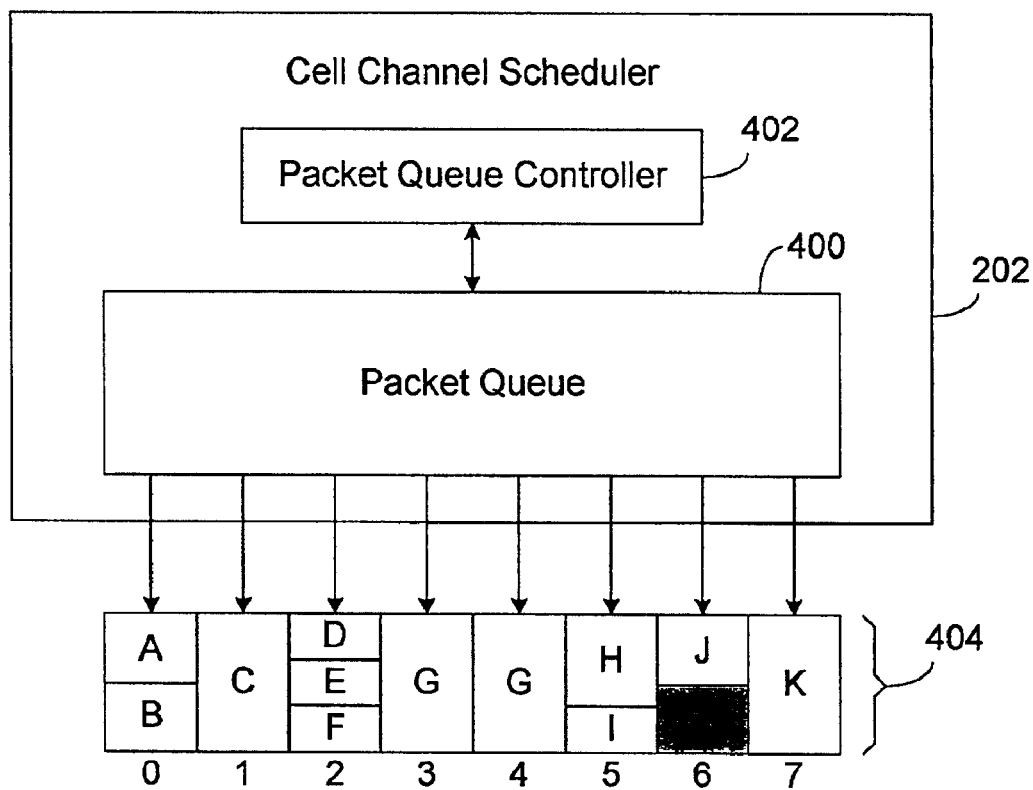
FIG. 4 illustrates a cell channel scheduler according to some embodiments of the invention.

In some embodiments, the channel utilization and packet queue measurements that are used to determine the packet data load may be obtained by monitoring the operation of the cell channel scheduler 202. FIG. 4 illustrates the cell channel scheduler 202 according to these embodiments of the present invention. The cell channel scheduler 202 has a number of functional components including a packet queue 400 and a packet queue controller 402. The packet queue controller 402 controls the channel scheduling and allocation of the packets 204 stored in the packet queue 400. The packet queue 400, on the other hand, serves as a temporary repository for the packets 204 received by the base transceiver station 104 until they can be dispositioned by the queue controller 402.

As mentioned previously, the packet data mobile radio network 100 has a flexible number of channels per allocated radio frequency 404. Accordingly, each one of the time slots 0–7 of the allocated radio frequency 404 may be shared by more than one mobile terminal or more than one time slot may be used by a single mobile terminal, as allocated and scheduled by the packet queue controller 402. For example, the packet queue controller 402 may allocate and schedule packets for mobile terminals A–K as follows: packets being transmitted to mobile terminals A and B equally share time slot 0; packets being transmitted to mobile terminal C exclusively occupy time slot 1; packets being transmitted to mobile terminals D, E, and F equally share time slot 2; packets being transmitted to mobile terminal G exclusively occupy both time slots 3 and 4; packets being transmitted to mobile terminals H and I unequally share time slot 5 with mobile terminal H having a larger portion of the time slot; packets being transmitted to mobile terminal J partially occupy time slot 6 with the remainder of the time slot being unused; and finally, packets being transmitted to mobile terminal K exclusively occupy time slot 7.

It should be noted that, although in some embodiments each allocated radio frequency 404 has eight time slots 0–7, a different number of time slots may certainly be used in other embodiments depending on the particular specifications of the packet data mobile radio network 100.

The foregoing channel utilization (i.e., channel allocation and scheduling) may subsequently be used as a basis to determine the packet data load in the cell or a portion thereof. Such channel utilization information may be obtained by the cell channel scheduler 202, for example, by monitoring the queue controller 402 in accordance with known techniques. The cell channel scheduler 202 may thereafter determine the packet data load, or it may simply pass the channel utilization information to the cell power control unit 200 to determine the packet data load. This packet data load information may then be factored into the power control algorithm 302 of the cell power control unit 200. The power control algorithm 302 may subsequently determine an equal or common power level for some, all, or substantially all the channels in the cell, as explained above.

In some embodiments, instead of channel utilization information, one or more measurements of the packets in the packet queue 400 may be used as a basis to determine the packet data load in the cell or a portion thereof. Such packet queue measurements may include, for example, the queue length of some, all, or substantially all the queues, the longest queue length of any single queue, the average or instant queue length change (i.e., the increase/decrease in queue length) for some, all, or substantially all the queues, the distribution of the packet sizes in some, all, or substantially all the queues, the largest packet size in any queue, and other similar packet queue measurements. As in the case of channel utilization information, the packet queue measurements may also be obtained by the cell channel scheduler 202, via monitoring of the packet queue 400 in accordance with known techniques. The cell channel scheduler 202 may thereafter determine the packet data load, or it may pass the measurements to the cell power control unit 200 for load determination.

Figure 5:
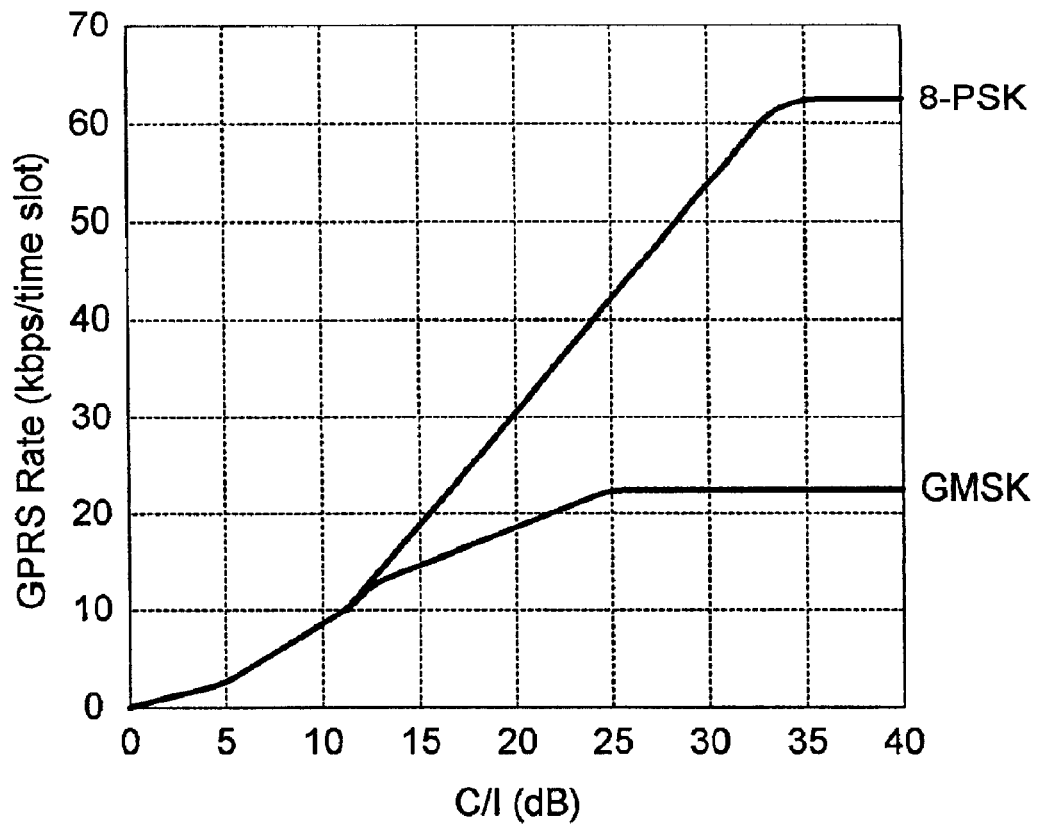
FIG. 5 illustrates a graph of time slot data rate versus C/I.

In some embodiments, a quality window may be implemented, within which the common cell power will result in a suitable data rate and/or throughput for the cell or a portion thereof. FIG. 5 illustrates a graph of data rate versus C/I for two exemplary types of data modulation, GMSK (Gaussian minimum shift keying) and 8-PSK (8 level phase shift keying), that may be used to define an exemplary quality window. The horizontal axis of the graph represents the C/I in dB, which may be a reflection of the broadcast or transmitted power, whereas the vertical axis represents the data rate in kbps/time slot. It should be noted that the graph illustrated in FIG. 5 is based solely on computer simulated data for a GPRS network and not on any actual data.

As can be seen, above a certain point there is little or no gain in the channel data rate to be obtained by increasing the C/I (e.g., via an increase in the broadcast or transmitted power). For GMSK modulation, this point may be found around a data rate of 20 kbps/time slot, and for 8-PSK modulation, this point may be found around a data rate of 60 kbps/time slot. Similarly, below a certain point, it is better to decrease the channel data rate (e.g., via a decrease in the number of time slots per channel) than to decrease the broadcast or transmitted power. This point may be located around a data rate of 8 kbps/time slot for purposes of minimizing transmitted power consumption. For purposes of minimizing interference to other channels, this point may be located around a data rate of 14 kbps/time slot. (See the article entitled "A Power Control and Scheduling Concept for EGPRS" mentioned above.) Accordingly, for GMSK, the lower and upper limits of the quality window may be approximately 7 –20 kbps/time slot, and approximately 14 –60 kbps/time slot for 8-PSK.

Note that the data rate has been described in terms of kbps per time slot. Thus, for a data rate of, say, 7 kbps/time slot, a channel that occupies two time slots, for example, has a total channel data rate of 14 kbps, whereas a channel that occupies half of one time slot has a channel data rate of 3.5 kbps.

The foregoing data points may be subsequently implemented as the upper and lower limits of a quality window that may be factored into the power control algorithm 302 for determining the equal or common power level for some, all, or substantially all the channels in the cell. For example, upon determination of the data rate for some, all, or substantially all channels in the cell, if any channel has a data rate that falls outside the quality window, then the power control algorithm 302 may cause the broadcast or transmitted power to the affected mobile terminal to be adjusted (e.g., increased or decreased) relative to the common power level in order to bring the channel data rate within the window. The individual channel data rate may be determined, for example, by the base transceiver station 104 in accordance with known techniques.

In other embodiments, instead of the channel data rate, the quality window may be implemented based on one or more other known channel quality measures. For example, referring again to FIG. 5, the upper and lower limits of the quality window may be based on the C/I. Under such an arrangement, the lower and upper limits of the quality window may be found around 7 –25 dB for GMSK, and around 7 –35 dB for 8-PSK. Accordingly, if the C/I for individual channel is determined (e.g., by the base transceiver station 104) to fall or drift outside this quality window, then the power control algorithm 302 may cause the broadcast or transmitted power to the affected mobile terminal to be adjusted relative to the common power level in order to bring the C/I back within the window.

In still other embodiments, the broadcast or transmitted power level for a given channel may be adjusted by a predefined offset based on the quality of service profile for the user. For example, a user who requires a certain channel data rate or a certain C/I may have a predefined offset applied relative to the common cell power level for packets being transmitted to his particular mobile terminal in order to ensure the required quality of service.

The foregoing description has been focused on embodiments of the invention involving the downlink channels or the channels carrying packets to be transmitted to the mobile terminals. The invention is not to be limited thereto, however, but in some embodiments, the teachings herein may also be applied to the uplink channels. In other words, a power control algorithm similar in function to the power control algorithm 302 may also be implemented in the base transceiver station 104 for mobile terminal power control. In that case, the packet queue measurement information may be limited, but the channel utilization information can certainly be available to be used in the mobile terminal power control algorithm.

Figure 6:
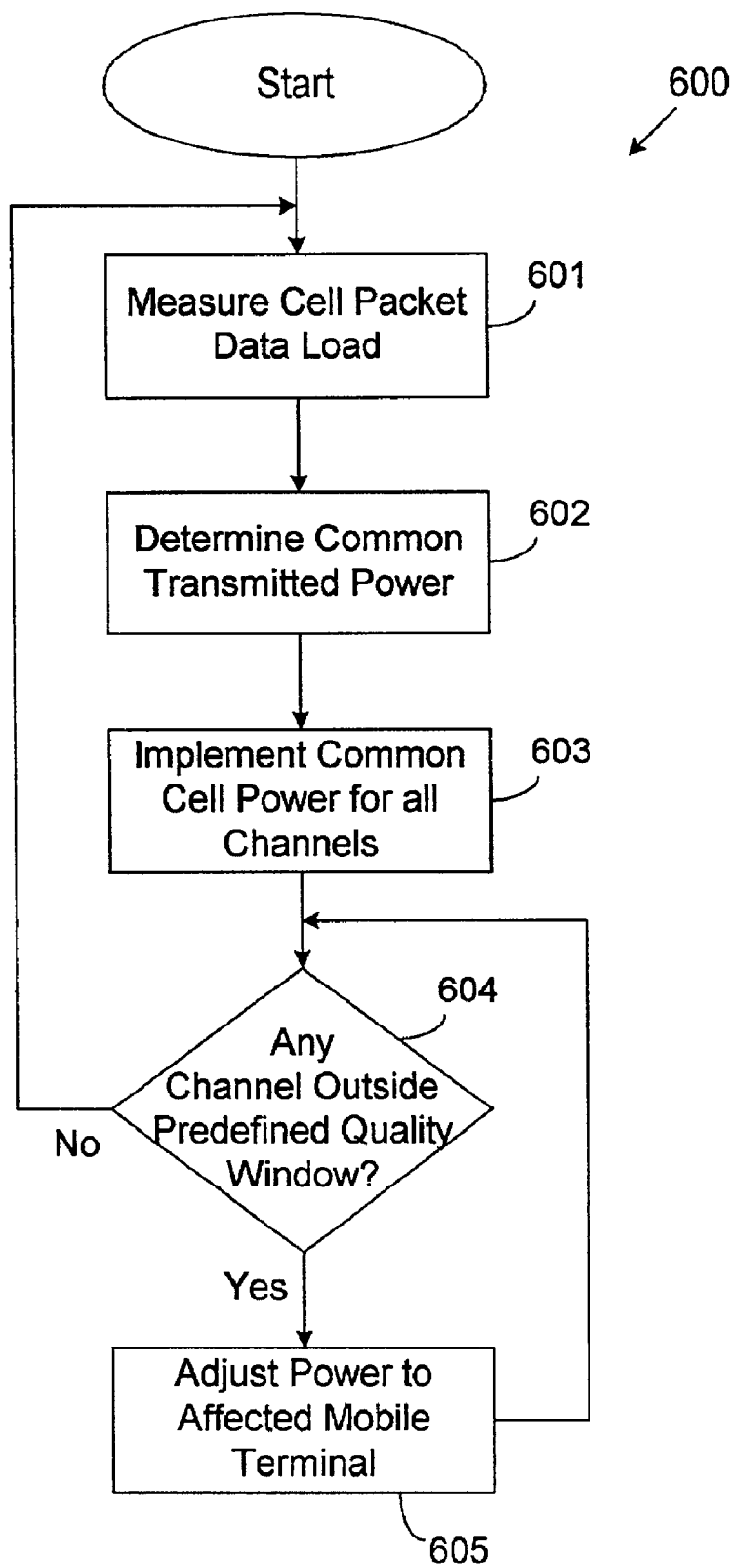
FIG. 6 illustrates a method according to some embodiments of the invention.

FIG. 6 illustrates a method of power control 600 according to one exemplary embodiment of the present invention. The method 600 can be used to improve the cell channel quality in a cell of a packet data mobile radio network by implementing an equal or common power level for some, all, or substantially all channels in the cell. At step 601, a packet data load for the cell or a portion thereof is measured using either the channel utilization, packet queue measurements, or a combination of both. A power control algorithm determines an equal or common broadcast or transmitted power level for some, all, or substantially all channels in the cell at step 602 based on the packet data load. Such packet data load may be an instant packet data load or a weighted version thereof, depending on the particular requirements of the packet data mobile radio network. At step 603, the equal or common power level is implemented for some, all, or substantially all channels in the cell. A determination is made at step 604 as to whether any channels in the cell are outside a quality window. The quality window may be based on channel quality measurements such as channel data rates, C/I, or other similar quality measurements. If the answer to step 604 is yes, then the broadcast or transmitted power for the affected mobile terminals is adjusted relative to the common cell power at step 605, and the method returns to step 604 for additional determinations. If the answer is no, then the method returns to the beginning at step 601.

Although various embodiments of the invention have been shown and described, it will be appreciated by those skilled in the art that changes may be made to these embodiments without departing from the principles and the teachings of the invention, the scope of which is defined in the appended claims.

What is claimed is:

1. A method of controlling transmitted power in a cell of a packet data mobile radio network, comprising the steps of:
    mensuring a packet data load in said cell wherein said packet data load is based on packet queue measurements; and wherein packet data load based on said queue measurements provide input to a power control algorithm that seeks to achieve a near optimal packet data rate and/or throughput for the cell by way of the following:

determining a common transmitted power based on said packet data load; and applying said common transmitted power to a plurality of channels in said call measuring a radio link quality for said plurality of channels and adjusting said common transmitted power for any channel having a radio link quality measure outside a predefined quality window.

2. The method according to claim 1, wherein said plurality of channels includes substantially all channels in said cell.

3. The method according to claim 1, wherein said plurality of channels includes a group of channels defined based on a quality of service requirement thereof.

4. The method according to claim 1, wherein said plurality of channels includes a group of users defined based on a quality of service requirement thereof.

5. The method according to claim 1, wherein said plurality of channels includes downlink channels.

6. The method according to claim 1, wherein said plurality of channels includes uplink channels.

7. The method according to claim 1, wherein said packet data load is weighted according to one or more predetermined criteria.

8. The method according to claim 1 wherein said common transmitted power is adjusted with a predestined offset based on individual user quality of service profiles.

9. The method according to claim 1, wherein said packet data load is based on channel utilization.

10. The method according to claim 1, wherein said packet data load is statistically derived over a predefined time period.

11. The method according to claim 1, Wherein said packet queue measurements include a total queue length.

12. The method according to claim 1, wherein said packet queue measurements include the longest queue.

13. The method according to claim 1, wherein said packet queue measurements include queue length changes.

14. The method according to claim 1, wherein said packet queue measurements include a packet length distribution.

15. The method according to claim 1, wherein said packet queue measurements include the longest packet.

16. The method according to claim 1, wherein said radio link quality includes a channel data rate.

17. The method according to claim 1, wherein said radio link quality includes a carrier-to-interference ratio.

18. The method according to claim 1, wherein the quality window is defined by a lower and upper channel data rate of approximately 7–20 kbps/time slot for GMSK and approximately 14–60 kbps/time slot for 8-PSK.

19. The method according to claim 1, wherein the quality window is defined by a lower and upper carrier-to-interference ratio of approximately 7–25 dB for GMSK and approximately 7–35 dB for 8-PSK.

20. A system for controlling transmitted power in a cell of a packet data mobile radio network, comprising:

a base transceiver station;

a channel scheduler in said base transceiver station configured to measure a packet data load in said cell, wherein said channel scheduler measures said packet data load based on packet queue measurements; and a power control unit connected to said channel scheduler and having a power control algorithm therein, said power control algorithm configured to determine a common transmitted power based on said packet data load, and said power control unit is configured to apply said common transmitted power to a plurality of channels in said cell, wherein said base station transceiver is configured to measure a radio link quality for said plurality of channels, and said power control algorithm is further configured to adjust said common transmitted power for an channel having a radio link quality measured outside a predefined quality window.

21. The system according to claim 20, wherein said plurality of channels includes substantially all channels in said cell.

22. The system according to claim 20, wherein said plurality of channels includes a group of channels defined based on a quality of service requirement thereof.

23. The system according to claim 20, wherein said plurality of channels includes a group of users defined based on a quality of service requirement thereof.

24. The system according to claim 20, wherein said plurality of channels includes downlink channels.

25. The system according to claim 20, wherein said plurality of channels includes uplink channels.

26. The system according to claim 20, wherein said packet data load is weighted according to one or more predetermined criteria.

27. The system according to claim 20, wherein said power control program is further configured to adjust said common transmitted power with a predestined offset based on individual user quality of service profiles.

28. The system according to claim 20, wherein said channel scheduler measures said packet data load based on channel utilization.

29. The system according to claim 20, wherein said packet data load is statistically derived over a predefined time period.

30. The system according to claim 20, wherein said packet queue measurements include a total queue length.

31. The system according to claim 20, wherein said packet queue measurements include the longest queue.

32. The system according to claim 20, wherein said packet queue measurements include queue length changes.

33. The system according to claim 20, wherein said packet queue measurements include a packet length distribution.

34. The system according to claim 20, wherein said packet queue measurements include the longest packet.

35. The system according to claim 20, wherein said radio link quality includes a channel data rate.

36. The system according to claim 20, wherein said radio link quality includes a carrier-to-interference ratio.

37. The system according to claim 20, wherein the quality window is defined by a lower and upper channel data rate of approximately 7–20 kbps/time slot for GMSK and approximately 14–60 kbps/time slot for 8-PSK.

38. The system according to claim 20, wherein the quality window is defined by a lower and upper carrier-to-interference ratio of approximately 7–25 dB for GMSK and approximately 7–35 dB for 8-PSK.

39. A method of controlling transmitted power in a cell of a packet data mobile radio network, comprising the steps of:

measuring a packet data load in said cell based on a predetermined one of channel utilization and packet queue measurements;

determining a common transmitted power based on said packet data load;

applying said common transmitted power to a plurality of channels in said cell;

measuring a radio link quality for said plurality of channels in said cell; and adjusting said common transmitted power for any channel having a radio link quality measure outside a quality window defined based on a predetermined one of channel data rate and carrier-to-interference ratio.

* * * * *

UNITED STATES PATENT AND TRADEMARK OFFICE
CERTIFICATE OF CORRECTION

PATENT NO.         : 6,950,669 B2                                         Page 1 of 1
APPLICATION NO. : 09/854798
DATED                 : September 27, 2005
INVENTOR(S)       : Arne Simonsson It is certified that error appears in the above-identified patent and that said Letters Patent is hereby corrected as shown below:

In Column 8, Line 66, in Claim 1, delete "mensuring" and insert -- measuring --, therefor.

In Column 9, Line 9, in Claim 1, delete "call" and insert -- cell --, therefor.

In Column 9, Line 29, in Claim 8, delete "predestined" and insert -- predefined --, therefor.

In Column 10, Line 29, in Claim 27, delete "predestined" and insert -- predefined --, therefor.

Signed and Sealed this

Twentieth Day of November, 2007

JON W. DUDAS
*Director of the United States Patent and Trademark Office*